3,142,661
POLYMERIZATION OF ACROLEIN AND METHACROLEIN

Heinrich Brendlein, Hanau am Main Hohe Tanne, Erich Bäder, Hanau am Main, Hermann Leyerzapf, Mainz, and Karl-Heinz Rink, Hanau am Main, Germany, assignors to Deutsche Gold- und Silber-Scheideanstalt vormals Roessler, Frankfurt am Main, Germany
No Drawing. Filed May 31, 1961, Ser. No. 113,604
Claims priority, application Germany June 2, 1960
4 Claims. (Cl. 260—67)

The present invention relates to an improved process for the controlled polymerization of acrolein and methacrolein.

It has been known for a long time that acrolein polymerizes spontaneously and that polymerization of acrolein can be initiated by ultra violet light rays (see F. E. Blacet, G. H. Fielding and J. C. Roof, J. Amer. Chem. Soc., 59, 2375 (1937)). The products thus produced have, however, not achieved any commercial significance.

The polymerization of acrolein also can be effected by various types of catalysts. In such instance either completely cross-linked polymers which do not give aldehyde reactions or only relatively low molecular weight homopolymers are obtained (see H. Schulz and H. Wagner, Angew. Chemie, 62, 112 (1950), German Patents 737,125, 745,422, 748,690 and French Patent 1,138,854).

The usual radical forming catalysts also effect polymerization of acrolein. For example, when employing azoisobutyric acid while in a benzene-methanol mixture a soluble polyacrolein with a molecular weight of 1310 is obtained in 24 hours at 85° C. (see U.S. Patent No. 2,657,192). When the polymerization is initiated with azo compounds or peroxides higher reaction temperatures are always required.

The acrolein polymerization processes yield polyacroleins of most varied molecular weight, but especially those of lower molecular weight. It is characteristic of such polymers that the major portion of the aldehyde groups contained in the polymeric molecule are not available for further chemical reactions.

According to a further process which has become known polyacrolein can be produced in which a substantial portion of the aldehyde groups contained therein, as an average, between 20 and 70%, can be converted to functional derivatives thereof under certain reaction conditions. This polymerization process is carried out with a redox catalyst system, preferably in aqueous solution and produces polyacroleins of high molecular weight (Makromolekulare Chemie, vol. 24, pages 141 ff., 1957).

However, for certain technical applications polyacroleins are desired which have a low or medium molecular weight and aldehyde groups which can be converted to functional derivatives under mild conditions.

According to the invention it was found that polyacroleins or polymethacroleins of low or medium molecular weight can be produced from acrolein or methacrolein monomers with the aid of a catalyst if the monomers are aged in the presence of water for a period of about 3 to 100 hours at temperatures between +20 and +60° C. before such catalysed polymerization. The catalysts employed can be the usual catalysts but redox systems, sulfur dioxide, sodium bisulfite and basic substances, such as piperidine and triethyl amine, are preferred. Preferably, the ageing as well as the polymerization are carried out with aqueous solutions of acrolein or methacrolein ranging from saturated solutions down to about 5% solutions. It is possible in this way, for example, to produce polyacroleins with molecular weights, which normally with redox catalysts are around 50,000, of less than 15,000. The molecular weight of the polyacrolein obtained is almost inversely proportional to the length of the ageing treatment before the polymerization when the temperatures are constant. Naturally the ageing period can be shortened when elevated temperatures, such as, for example, 30–40° C., are employed.

It was furthermore found that the molecular weight lowering effect achieved according to the invention depends to some extent upon the purity of the acrolein employed. For example, when a pure acrolein obtained from technical grade acrolein stabilized with hydroquinone by distillation under nitrogen with separation of the first runnings, which upon direct polymerization gives polyacrolein of a molecular weight of about 40,000, was first aged at room temperature for 24 hours in the presence of water polyacrolein of a molecular weight of about 25,000 was obtained. If, on the other hand, crude destabilized acrolein obtained by distillation of technical grade stabilized acrolein without separation of the first runnings was aged in the presence of water for about 5 hours at 40° C. before polymerization a polyacrolein of a molecular weight of 14,500 was obtained whereas when the destabilized crude acrolein was polymerized without ageing polyacrolein of a molecular weight of about 25,000 was obtained.

The process according to the invention renders it possible to produce polyacroleins and polymethacroleins of a desired molecular weight within a wide range in a reproducible manner. The polymers produced contain over 65% of their aldehyde groups in reaction form when a redox system or the other preferred types of catalysts indicated above are used as catalysts. It is, however, also possible to use other catalysts which are known for the polymerization of acrolein in the process according to the invention and in such instance the molecular weight of the polymer also will be reduced.

The redox systems which preferably are employed according to the invention, as is known, consist of an oxidizing agent, preferably hydrogen peroxide, organic hydroperoxides or peroxides, as well as salt-like inorganic peroxidic compounds, and reducing agents, such as inorganic salts of multi valent metals in the lower valent stages or other easily oxidizable substances, such as nitrous acid and amines. Preferably the oxidizing and reducing components are employed in stoichiometric quantities although other proportions can be used.

In general, only very small quantities of catalysts suffice. In general, it is sufficient to employ 0.001 to 0.05 mol of initiator per mol of acrolein compound.

The polymerization proceeds even at low temperatures and can be carried out below 100° C. and preferably between 0 and 30° C.

The polymerization is carried out in an aqueous medium and preferably with a saturated aqueous solution of acrolein.

Of course, the process according to the invention is not limited to the homopolymerization of acrolein as it can also be employed in the copolymerization thereof with minor quantities of other monomeric vinyl compounds, such as acrylonitrile, styrene, acrylic acid and methacrylic acid esters.

The properties of the polymers produced according to the invention with reference to further chemical reactions, especially with the aldehyde groups, do not differ from those of the high molecular weight polymers produced without the ageing step. They can be used in the production of molded bodies in the same manner as those produced by conventional processes. Also, additional substances improving the chemical stability and mechanical properties of the polymers can also be added thereto.

The following examples will serve to illustrate the process according to the invention.

Example 1

Technical acrolein which contained 0.2% of hydroquinone as stabilizer was distilled under nitrogen over a small column. Bright copper wires were placed in the column and receiver of the distillation apparatus to prevent premature spontaneous polymerization during the distillation. The first 10% of the distillate (first runnings) were discarded. 100 cc. of the thus freshly distilled acrolein were dissolved in 500 cc. of oxygen free distilled water and the resulting solution permitted to age for 24 hours at room temperature (20° C.). After such ageing 3 g. of potassium persulfate and a solution of 2 g. of silver nitrate in 10 cc. of water were added thereto and the polymerization permitted to go to completion (about 3 hours) while moderately cooling the mixture to maintain a temperature of 22–23° C. The polyacrolein which precipitated out was thoroughly washed out with sodium thiosulfate and distilled water, suction filtered and the residue squeezed out. A polyacrolein of a molecular weight of 25,000 was obtained in an 86% yield.

When the procedure was repeated except that the ageing period was lengthened to 3 days, polyacrolein of a molecular weight of 21,000 was obtained in a 72.5% yield.

When, on the other hand, the procedure was repeated with omission of the ageing period, that is the catalyst was added to the solution of the freshly distilled acrolein in 500 cc. of water directly after its preparation, polyacrolein of a molecular weight of 45,000 was obtained in an 85% yield. When an acrolein of a purer grade was employed, that is, one obtained by separating off 15 to 20% of the first runnings, without the ageing step according to the invention, polyacrolein of a molecular weight of about 50,000 was obtained.

Example 2

Technical stabilized acrolein as used as starting material in Example 1 was destabilized by simple distillation without separating off any first runnings. 100 cc. of this acrolein (purity 90.5%) were dissolved in 500 cc. of distilled water and the solution allowed to age at 40° C. for 5 hours. The aged solution thus obtained was then polymerized as described in Example 1. The yield of moist polyacrolein was 273 g. with a dry substance content of 21.5% corresponding to a yield 74% of the theoretical. Its molecular weight was 14,500.

When the procedure was repeated except that the aqueous acrolein solution was aged for 5 hours at 30° C. rather than 40° C., 300 g. of moist polyacrolein with a dry substance content of 21.14% corresponding to a 79.2% of the theoretical yield were obtained. Its molecular weight was 20,500.

We claim:

1. In a process for the catalytic polymerization of an acrolein compound selected from the group consisting of acrolein and methacrolein in the presence of water, the steps which comprise preparing an aqueous solution of such acrolein compound of a concentration between 5% and its saturation point, such solution being devoid of polymerization catalysts, holding such solution for a period of 3 to 100 hours at 20 to 60° C. and only thereafter adding the polymerization catalyst to the thus held solution to effect polymerization.

2. The process of claim 1 in which said polymerization catalyst is a redox catalyst system.

3. The process of claim 1 in which said holding of such solution is carried out at a temperature between 30 and 60° C.

4. The process of claim 1 in which said aqueous solution of acrolein is prepared from freshly distilled acrolein.

References Cited in the file of this patent

UNITED STATES PATENTS

| | | |
|---|---|---|
| 2,996,481 | Eifert et al. | Aug. 15, 1961 |
| 3,036,978 | Kern et al. | May 29, 1962 |

OTHER REFERENCES

Grant: "Hackh's Chemical Dictionary," McGraw-Hill Book Company Inc. (New York, N.Y.), 1944, page 23 relied on.